United States Patent
Stoutchinin et al.

(10) Patent No.: US 10,346,322 B2
(45) Date of Patent: Jul. 9, 2019

(54) ONBOARD KAHN NETWORK TYPE SYSTEM COMPRISING A PLURALITY OF SOURCE AND DESTINATION ACTORS IN ORDER TO MANAGE BUFFER MEMORIES BASED ON TOKENS

(71) Applicant: STMICROELECTRONICS (GRENOBLE 2) SAS, Grenoble (FR)

(72) Inventors: Arthur Stoutchinin, L'Albenc (FR); Didier Fuin, Lumbin (FR); Mario Toma, Grenoble (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 248 days.

(21) Appl. No.: 15/355,188

(22) Filed: Nov. 18, 2016

(65) Prior Publication Data

US 2017/0308485 A1   Oct. 26, 2017

(30) Foreign Application Priority Data

Apr. 25, 2016  (FR) ...................... 16 53616

(51) Int. Cl.

| | | |
|---|---|---|
| *G06F 13/00* | (2006.01) | |
| *G06F 13/16* | (2006.01) | |
| *G06F 15/82* | (2006.01) | |
| *G06F 11/36* | (2006.01) | |
| *G06F 9/448* | (2018.01) | |
| *G06F 8/34* | (2018.01) | |

(52) U.S. Cl.
CPC ...... *G06F 13/1673* (2013.01); *G06F 13/1689* (2013.01); *G06F 15/82* (2013.01); *G06F 8/34* (2013.01); *G06F 9/4494* (2018.02); *G06F 11/3604* (2013.01)

(58) Field of Classification Search
CPC ...... G06F 8/34; G06F 11/3604; G06F 9/4494; G06F 13/1673; G06F 13/1689
See application file for complete search history.

(56) References Cited

U.S. PATENT DOCUMENTS

| 8,893,080 B2 * | 11/2014 | Von Platen | ........... G06F 9/4494 717/106 |
|---|---|---|---|
| 2012/0030646 A1 * | 2/2012 | Ravindran | ................ G06F 8/34 717/105 |
| 2014/0013313 A1 * | 1/2014 | Eker | ................... G06F 11/3604 717/132 |

OTHER PUBLICATIONS

Burgio, P. et al., "Architecture and Programming Model Support for Efficient Heterogeneous Computing on Tigthly-Coupled Shared-Memory Clusters," Design and Architectures for Signal and Image Processing (DASIP), 2013, 8 pages.

(Continued)

*Primary Examiner* — Tammara R Peyton
(74) *Attorney, Agent, or Firm* — Slater Matsil, LLP

(57) ABSTRACT

An electronic system implements a software application described in the form of a graph of the Kahn network type, and includes actors. At least one of the actors includes a processor, and at least another one of the actors includes a hardware accelerator. Buffer memories are coupled between the actors. A central processor is configured to enable communications between the actors according to a communications and synchronization protocol. The processor and the hardware accelerator are configured to use different individual communications protocols.

22 Claims, 2 Drawing Sheets

(56) References Cited

OTHER PUBLICATIONS

Conti, F. et al., "Synthesis-friendly techniques for tightly-coupled integration of hardware accelerators into shared-memory multi-core clusters," International Conference on Hardware/Software Codesign and System Synthesis, 2013, 11 pages.
Dehyadegari, M. et al., "A Tightly-Coupled Multi-Core Cluster with Shared-Memory HW Accelerators," 2012 International Conference on Embedded Computer Systems (SAMOS), Jul. 2012, 8 pages.
Fajardo, C.F. et al., "Buffer-Integrated-Cache: A Cost-Effective SRAM Architecture for Handheld and Embedded Platforms," In Design Automation Conference (DAC), 2011 48th ACM/EDAC/IEEE, 2011, 6 pages.
Stefanov, T. et al., "System Design using Kahn Process Networks: The Compaan/Laura Approach," Leiden Embedded Research Center, Leiden Institute of Advanced Computer Science, Leiden University, The Netherlands, Presented in Paris France, Feb. 16-20, 2004, 6 pages.
Venkatesh, G. et al., "Conservation Cores: Reducing the Energy of Mature Computations," Conservation cores: Reducing the Energy of Mature Computations, In Proceedings of the 15th edition of ASPLOS 10, New York, USA, 2010, 14 pages.
Viskic, I. et al., "Design Exploration and Automatic Generation of MPSoC Platform TLMs from Kahn Process Network Application," University of California ACM Sigplan Notices vol. 45, No. 4, Apr. 13, 2010, 8 pages.

\* cited by examiner

ONBOARD KAHN NETWORK TYPE SYSTEM COMPRISING A PLURALITY OF SOURCE AND DESTINATION ACTORS IN ORDER TO MANAGE BUFFER MEMORIES BASED ON TOKENS

RELATED APPLICATIONS

This application is a translation of and claims the priority benefit of French patent application number 1653616 filed on Apr. 25, 2016, entitled "ON BOARD ELECTRONIC SYSTEM" which is hereby incorporated by reference to the maximum extent allowable by law.

FIELD OF THE INVENTION

Various embodiments of the invention relate to electronic systems, and more particularly, to electronic systems comprising onboard multiprocessor architectures. Example onboard multiprocessor architectures include processors, microcontrollers, and hardware accelerators specific to each application, such as computer vision, data analysis, image processing and video processing.

BACKGROUND

As a result of the simultaneous development of the technology and the requirements of the market, improved performances of such electronic systems have demands for an increasingly limited time-to-market.

Furthermore, designers are generally required to design such electronic systems while providing both design flexibilities and better efficiencies in terms of performance, power consumption, and silicon surface area used. This is also denoted by those skilled in the art under the acronym PPA (Performance Power Area), and this is even more the case for onboard systems.

However, the current design for such an electronic system is limited to inefficient integrations between programmable processors and hardware accelerators specific to each application since they are generally loosely coupled via a high-speed communications system. The high-speed communications system may be, for example, a gigabit Ethernet network, and the processors and the hardware accelerators use different communications protocols.

Indeed, generally speaking, the accelerators execute massive parallel stream processing operations, whereas the processors carry out sequential processing operations of the load/store type.

Currently, the level of complexity for programming such an electronic system with conventional tools is often very high. The level of complexity is even more so if parallel processing and a global optimization on the management of the resources, such as the memory and the programmable processors, are taken into account.

In addition, it is difficult to partition such an electronic system into two parts, one hardware part and one software part, since in order to do this these two parts need to be significantly modified. A procedure for exploring or for verifying such an architecture is also time consuming.

SUMMARY

A low complexity technical approach is provided for producing a multiprocessor system, notably onboard, having a hardware/software architecture that is tightly coupled between hardware accelerators and programmable processors via a shared memory.

According to one aspect, an electronic system may be configured for implementing a software application described in the form of a graph of the Kahn network type comprising actors. The Kahn network type is commonly denoted by those skilled in the art under the acronym KPN (Kahn Process Network).

At least one of the actors may comprise a processor and at least another one of the actors may comprise a hardware accelerator. The system may further comprise buffer memories coupled between the various actors, and central processing means or a central processor configured to enable communications between the actors according to a common communications and synchronization protocol. The processor and the hardware accelerator may be designed to use different individual communications protocol.

Such a common communications and synchronization protocol based on a model for execution of a Kahn network advantageously may allow efficient communications and synchronizations to be carried out between the various actors. For example, actors may include the at least one accelerator and the at least one processor.

The processor may comprise a shared memory containing the buffer memories, and shared synchronization counters associated with the buffer memories. The communications and synchronization protocol applied between the actors may be based on the shared synchronization counters.

The processor may be configured for managing the buffer memories on the basis of tokens. Each buffer memory may comprise at least one token initially in a FREE state, and may be coupled to a source actor and to a destination actor. The processor may be configured for managing the following functions:

a RESERVE function usable by any given source actor and designed for requesting the buffer memory coupled to the source actor to supply a token in a FREE state;

a PUSH function usable by any given source actor and designed for returning a modified token to the buffer memory, coupled to the source actor, subsequent to a modification of a token in the FREE state;

a POP function usable by any given destination actor and designed for capturing a modified token of the buffer memory coupled to the destination actor; and a RELEASE function usable by any given destination actor and designed for putting a modified token of the buffer memory coupled to the destination actor back into the FREE state.

Furthermore, the shared counters may comprise a write counter configured to be incremented following each implementation of the PUSH function, and a release counter configured to be incremented following each implementation of the RELEASE function. The non-shared counters may comprise a reservation counter configured to be incremented following each implementation of the RESERVE function, and a capture counter configured to be incremented following each implementation of the POP function.

Furthermore, the processor may be configured for applying a blocking of the RESERVE function on the basis of the value of the difference between the content of the reservation counter and the release counter, and of a comparison between this difference value and the capacity of the associated buffer memory. The processor may also be configured for applying a blocking of the POP function on the basis of the difference value between the content of the write counter and the POP counter.

Advantageously, the graph of the Kahn network type may support parallel processing between the actors. For this purpose, the set of broadcast buffer memories may comprise at least one broadcast buffer memory coupled to a single source actor and to at least two destination actors. At least one acquisition buffer memory may be coupled to at least two source actors and to a single destination actor.

The processor may be further configured for managing the buffer memories on the basis of tokens and for managing the following functions:

a BROADCAST function usable by the at least two destination actors and designed for capturing in parallel the same modified token generated by the single source actor, and available in the buffer memory of the broadcast type, and for subsequently putting the same modified token back into its FREE state; and an ACQUISITION function usable by the at least two source actors and designed so that each of these source actors may request from the at least one acquisition buffer memory a token in the FREE state, and so that each one subsequently sends back to the at least one acquisition buffer memory a modified token following a modification of the token in the FREE state.

The processor may comprise at least one communications interface coupled between the shared memory and the at least one hardware accelerator, and control means or a controller configured for supporting the common communications and synchronization protocol.

The controller may, for example, provide direct access to the shared memory. The controller may be synchronized via the shared synchronization counters and be programmed by a software actor.

The shared memory may operate as a physical support for implementing the protocol which is also supported in the form of hardware by the communications interface and by the controller.

Each communications interface may advantageously be configured for receiving an operations request stream coming from the corresponding hardware accelerator and for delivering memory operations commands to the shared memory. Each interface may also comprise a control block or module for controlling the buffer memories configured for managing the buffer memories coupled to the hardware accelerators on the basis of tokens, a synchronization block or module to carry out synchronizations of the tokens, and a processing block or module configured for implementing the protocol.

By way of example, the common communications and synchronization protocol may be adapted to parallel data processing between the actors and to the use of global variables shared by the actors.

BRIEF DESCRIPTION OF THE DRAWINGS

Other advantages and features of the invention will become apparent upon examining the detailed description of non-limiting embodiments and from the appended drawings in which.

DETAILED DESCRIPTION

Figure 1:
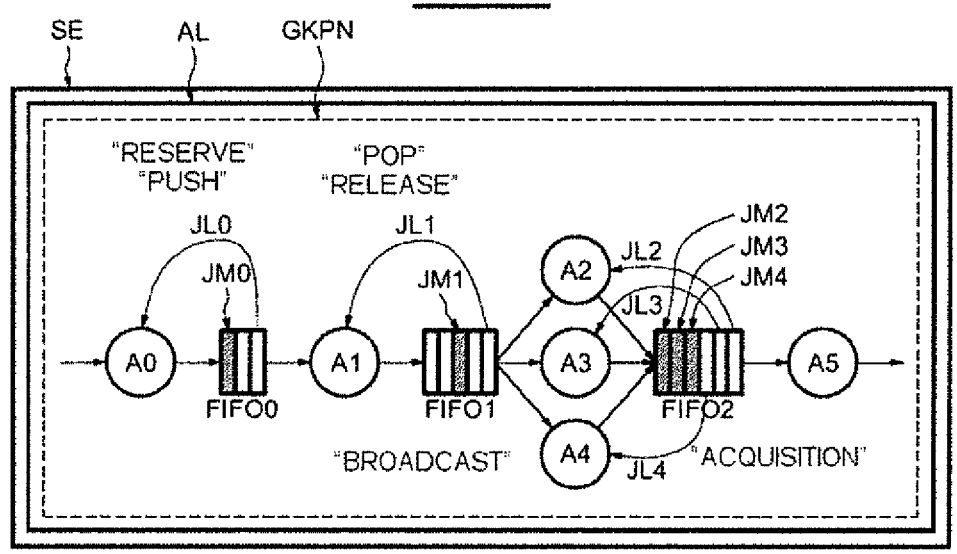
FIGS. 1 to 5 illustrate schematically various embodiments of the invention.

The electronic system SE is configured for implementing a software application AL (FIG. 1). The latter is described in the form of a graph of the Kahn network type GKPN which comprises actors Ai and buffer memories FIFOj. The buffer memories, for example, may be based on the first-in-first-out (FIFO) principle, and coupled between the actors Ai.

The actors may advantageously be implemented in the form of software modules within processors or in the form of hardware, for example, within a hardware accelerator.

Figure 2:
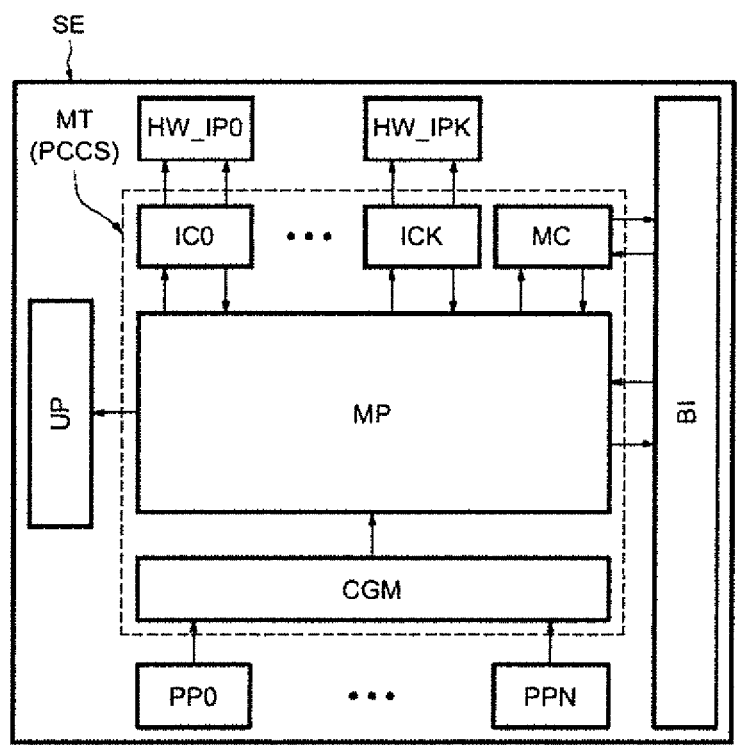

FIG. 2 illustrates schematically one example of an electronic system SE configured for implementing a software application of the type illustrated in FIG. 1.

The actors comprise, for example, programmable processors PP0 to PPn and units specialized in hardware acceleration HW_IP0 to HW_IPK. These hardware accelerators HW_IP0 to HW_IPK may, for example, be of the type dedicated to a specific operator for image or signal processing, such as coding, transformation and convolution, etc., notably comprising a data-flow interface.

The electronic system SE also comprises a processor MT comprising a shared memory MP and communications interfaces IC0 to ICK, respectively coupled between the hardware accelerators HW_IP0 to HW_IPK and the shared memory MP. The central processor MT is configured to enable communications between the actors Ai according to a common communications and synchronization protocol PCCS.

The shared memory MP is furthermore coupled to peripheral units UP according to a tightly-coupled protocol. A peripheral unit may, for example, be an interrupt controller.

An interconnection bus BI is coupled to the shared memory MP and to a controller MC. The interconnection bus BI may, for example, provide direct access to the memory (Direct Memory Access: DMA).

The hardware accelerators HW_IP0 to HW_IPK are designed to use stream communications protocols which are different from the sequential ones used by the processors PP0 to PPN.

As in a conventional Kahn network, the actors Ai of the graph of the Kahn network type GKPN may be source actors A0 to A4 as seen by the following actors A1 to A5 and/or may be destination actors A1 to A5 as seen by the preceding actors A0 to A4. An actor may be simultaneously a source actor and a destination actor, such as the actors A1 to A4 illustrated in FIG. 1.

All the buffer memories, here the memories FIFO0 to FIFO4 illustrated in FIG. 2, coupled between the actors Ai, may be circular buffer memories, for example, which operate on the basis of tokens.

The graph GKPN and all the buffer memories FIFO0 to FIFO4 are advantageously implemented within the shared memory MP. Each buffer memory FIFOj comprises, for example, M buffer memory locations and M corresponding tokens.

Examples of functions used in the graph GKPN will now be described referring once again to FIG. 1. All the tokens are initialized in a FREE state.

With regard to a source actor, for example, the source actor A0, a function called RESERVE is initially carried out corresponding to a request for a free buffer memory space in a buffer memory, for example the memory FIFO0, coupled between the source actor A0 and a corresponding destination actor A1.

In other words, the source actor A0 requests a token in the FREE state JL0 in the corresponding buffer memory FIFO0. If such a request can be satisfied, the buffer memory FIFO0 delivers the token JL0 to the source actor A0 and authorizes it to modify/write the token JL0.

Once the source actor A0 has finished the modification of the token JL0, the source actor A0 can perform a function called PUSH in order to send a modified token JM0 back to the buffer memory A0.

With regard to a destination actor, for example, the destination actor A1 as seen by the source actor A0, it can initially perform a function called POP. POP corresponds to the capture of a modified token in a buffer memory, for example, the modified token JM0 of the buffer memory A0.

The destination actor A1 captures the modified token JM0 once its request for capture has been validated by the buffer memory FIFO0. The destination actor A1 is subsequently authorized to read the modified token JM0 and to use data recorded in it.

Once the destination actor A1 has finished operations on the modified token JM0, the destination actor A1 can perform a function called RELEASE in order to put back the modified token JM0 into its FREE state. The modified token JM0 reverts back to the token JL0. For this reason, the source actor A0 can re-use the token in the FREE state JL0 available in the buffer memory FIFO0 via the RESERVE function.

The graph of the Kahn network type GKPN furthermore supports a parallel data processing. For this purpose, the set of buffer memories FIFOj comprises at least one buffer memory referred to as a broadcast memory. The broadcast memory may be, for example, the memory FIFO1 coupled to a single source actor, such as the actor A1, and to at least two destination actors, such as actors A2 to A4.

Indeed, the single source actor A1 can generate and deliver a modified token JM1 to the broadcast buffer memory FIFO1 by applying the RESERVE and PUSH functions.

The at least two actors A2 to A4 can subsequently perform a function called BROADCAST so as to capture in parallel the same modified token JM1 available in the broadcast buffer memory FIFO1.

Once the at least two actors A2 to A4 have consumed the same modified token JM1, they can subsequently put it back into its FREE state. The token JM1 becomes the token in the FREE state JL1.

The set of buffer memories FIFOj furthermore comprises at least one acquisition buffer memory, such as, for example, the memory FIFO2 coupled to at least two source actors. The two source actors, for example, are actors A2 to A4 and a single destination actor, such as actor A5.

The at least two source actors A2 to A4 can perform a function called ACQUISITION supported by the central processor MT for each request from the acquisition buffer memory FIFO2 for a token in the FREE state JL2 to JL4. If these tokens JL2 to JL4 are available in the acquisition buffer memory FIFO2, the actors A2 to A4 modify them prospectively and subsequently each send, in a parallel manner, a modified token JM2, JM3 and JM4 back to the acquisition buffer memory FIFO2. The acquisition buffer memory FIFO2 receives three modified tokens JM2 to JM4 at the same time.

The management of the buffer memories associated with the processor actors, configured for delivering and storing the various tokens, can be carried out by a memory management controller CGM.

As will be explained in more detail below, the management of the buffer memories associated with the hardware actors HW_IP0 to HW_IPK may be implemented by a controller MCMT incorporated into the communications interfaces IC0 to ICK.

Furthermore, the graph of the Kahn network type GKPN advantageously allows global variables, for example, of the C/C++ language, to be supported so as to facilitate the parallel processing of the sequential reference codes. The sequential reference codes are often written in C or C++ to lighten the programming complexity.

As indicated above, the common communications and synchronization protocol PCCS is supported in all the actors Ai and all the buffer memories FIFOj of the graph of the Kahn network type GKPN. The synchronization mechanism is indeed provided in each buffer memory FIFOj via shared counters CP and non-shared counters CNP.

Figure 3:
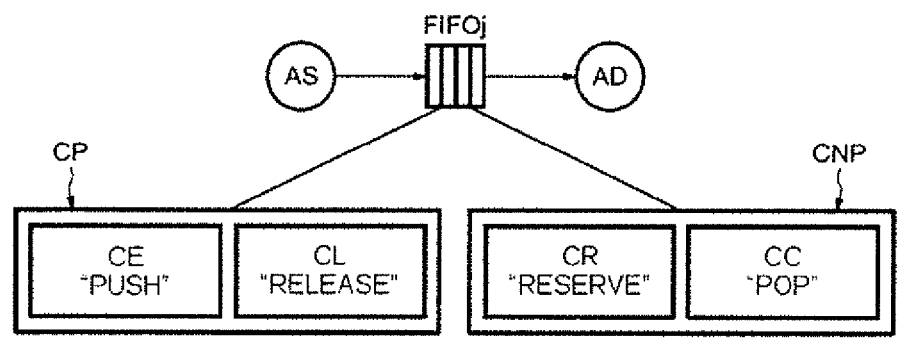

Reference is now made to FIG. 3 in order to illustrate one example of a buffer memory and of its shared counters CP and non-shared counters CNP according to the disclosure.

With each buffer memory FIFOj is associated two shared counters CP comprising a write counter CE incremented following each operation of the PUSH function, and a release counter CL incremented following each operation of the RELEASE function. These two shared counters CP of each buffer memory FIFOj may be implemented within the shared memory MP.

The write counter CE and the release counter CL of a buffer memory FIFOj are visible and shared only by the two actors A5 and AD coupled to the buffer memory FIFOj. Only the source actor A5 can modify the write counter CE and only the destination actor AD can modify the release counter CL.

Furthermore, with each buffer memory FIFOj is associated two non-shared counters CNP comprising a reservation counter CR incremented following each operation of the RESERVE function and visible only by the associated source actor AS, and a capture counter CC incremented following each operation of the POP function and visible only by the associated destination actor.

The common communications and synchronization protocol PCCS also provides a blocking on the RESERVE actions and another blocking on the POP actions.

When the difference between the content of the reservation counter CR and that of the release counter CL, in other words CR-CL is equal to or greater than the capacity of the buffer memory FIFOj, the protocol PCCS blocks the RESERVE function in the time domain so as to wait for a new FREE token generated by the RELEASE function.

When the difference between the content of the write counter CE and that of the capture counter CC is equal to zero, the protocol PCCS blocks the POP function in the time domain so as to wait for the arrival of a new modified token generated by the PUSH function.

By virtue notably of these functions described above, the actors Ai of the graph GKPN may be implemented in the form of software modules (processors) or of hardware accelerators by applying the same protocol PCCS.

It should be noted that the controller MC for direct access to the memory MP illustrated in FIG. 2 is also configured for supporting the protocol PCCS via shared counters CP and non-shared counters CNP. Indeed, any one of the software actors can program the direct memory access DMA in such a manner as to carry out operations of the PUSH and RELEASE functions.

Figure 4:
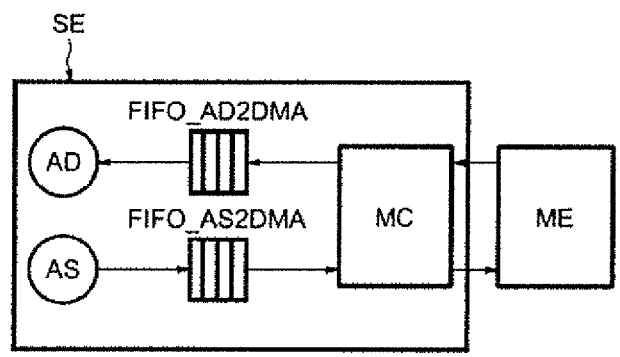

FIG. 4 illustrates the operation of one example of direct memory access. More precisely, during a data transfer, for example, coming from an external memory ME via the controller MC, to a destination actor AD within the electronic system SE, the external memory ME operates as a source actor and it launches a transfer of the DMA type, well known to those skilled in the art. The controller MC for direct access to the memory is responsible for modifying a token of a buffer memory FIFO_AD2DMA coupled between the controller MC and the destination actor AD2, and for performing a PUSH action in place of the external memory ME. The write counter CE of the buffer memory MT is incremented after the PUSH action.

In the case of a data transfer, for example, coming from a source actor AS of the electronic system SE to the external memory ME via the corresponding controller MC, the source actor AS writes a token of the buffer memory MT and launches a DMA transfer without performing a PUSH action. The controller MC is configured for carrying out a RELEASE action in order to release the token and increment the release counter CL of a buffer memory FIFO_AS2DMA coupled between the source actor AS and the controller MC when the DMA transfer has finished.

Figure 5:
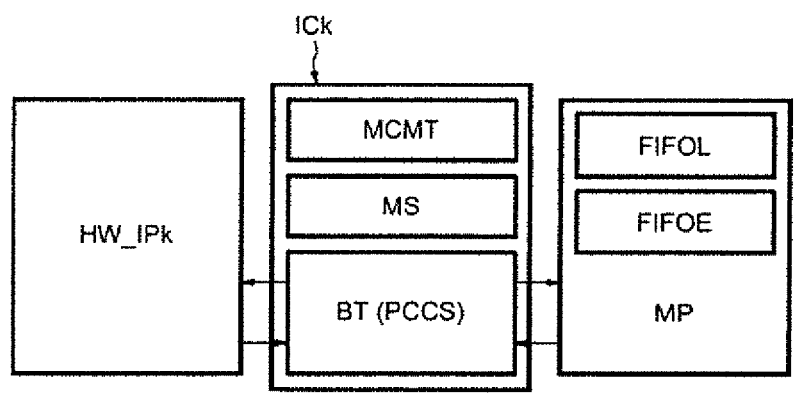

Reference is now made to FIG. 5 in order to illustrate one example of a communications interface ICk. The communications interface ICk receives at its input a stream of the requests for the read/write operations coming from the corresponding hardware accelerator HW_IPk, and generates at its output requests for load/store operations to the shared memory MP. The requests for read/write operations follow a stream protocol, whereas the requests for load/store operations are formed according to a load/store protocol.

The communications interface ICk comprises a control block for controlling the buffer memories MCMT configured for managing read/write buffer memories FIFOL/FIFOE coupled to the communications interface ICk, a synchronization block MS configured for carrying out synchronizations of the tokens, and a processing block BT designed to implement the common communications and synchronization protocol PCCS.

To process read operations requests received by a read buffer memory FIFOL, the synchronization block MS is configured for reading the value of the write counter associated with the read buffer memory FIFOL and for comparing it with that of the pop counter associated with the same buffer memory FIFOL so as to determine the presence of a new modified token.

If the modified token is present and there is a read operation request received by the read buffer memory FIFOL, the processing block BT transmits the responses from the shared memory MP to the hardware accelerator HW_IP0 up until the number of read operations is equal to a first number equal to the size of the modified token. When the number of read operations becomes equal to the size of the modified token, the RELEASE counter, i.e., the shared counter of the read buffer memory FIFOL, is incremented. The read buffer memory FIFOL blocks the POP function in the time domain until there is a new modified token.

The access and the delivery of the responses from the shared memory to the hardware accelerator are authorized as soon as there is a modified token. The non-shared POP counter is incremented when the number of read operation requests reaches the size of the token. The read operation remains blocked when there are too many read requests with respect to the size of the token and the system then waits for a new token.

With regard to processing of write operation requests received by a write buffer memory FIFOE, the synchronization block MS reads the value of the reservation counter associated with the write buffer memory FIFOE, and compares it with that of the release counter associated with the same buffer memory FIFOE so as to determine whether a new FREE token is present.

If the FREE token is present and there is a write request received by the write buffer memory FIFOE, the processing block BT delivers the storage requests to the shared memory MP up until the number of write operation requests is equal to a second number corresponding to the size of the FREE token. When the number of write operation requests becomes equal to the size of the FREE token, the write counter, i.e., the shared counter of the write buffer memory FIFOE, is incremented. The write buffer memory FIFOE blocks the RESERVE function in the time domain until there is a new FREE token.

The first number and the second number may be identical or different and that the non-shared counters of the read/write buffer memories FIFOL/FIFOE, i.e., the pop and reservation counters, are respectively incremented after each POP/RESERVE action.

Thus, the communications interfaces IC0 to ICk advantageously allow direct and fast conversion of the read/write operations requests coming from the hardware accelerators HW_IP0 to HW_IPK into those for load/store operations usable in the shared memory MP.

That which is claimed is:

1. An electronic system for implementing a software application described in a form of a graph of the Kahn network type, and comprising:
   a plurality of actors, with at least one of said actors comprising a processor and at least another one of said actors comprising a hardware accelerator; and
   a central processor comprising a plurality of buffer memories coupled between said plurality of actors and configured to enable communications between said plurality of actors according to a communications and synchronization protocol, wherein said processor and said hardware accelerator are configured to use different individual communications and synchronization protocols, wherein said central processor comprises:
      a plurality of shared synchronization counters and a plurality of non-shared synchronization counters associated with said plurality of buffer memories, with the communications and synchronization protocol applied between said plurality of actors based on said plurality of shared synchronization counters and said plurality of non-shared synchronization counters, wherein said central processor is configured for managing said plurality of buffer memories based on a token, said plurality of actors comprising a plurality of source actors and a plurality of destination actors, and with each buffer memory comprising at least one token initially in a FREE state and coupled to said at least one source actor and to said at least one destination actor.

2. The electronic system according to claim 1, wherein said central processor is configured for managing a plurality of functions comprising:
   a RESERVE function usable by any given source actor for requesting one of said buffer memories coupled to one of said source actors to supply a token in a FREE state;
   a PUSH function usable by any given source actor for returning to one of said buffer memories coupled to one of said source actors a modified token following a modification of a token in the FREE state;
   a POP function usable by any given destination actor for capturing a modified token of one of said buffer memories coupled to one of said destination actors; and a RELEASE function usable by any given destination actor for putting a modified token of one of said buffer memories coupled to one of said destination actors back into the FREE state.

3. The electronic system according to claim 2, wherein said plurality of shared synchronization counters comprises a write counter configured to be incremented following each implementation of the PUSH function, and a release counter configured to be incremented following each implementation of the RELEASE function; and wherein said plurality of non-shared synchronization counters comprises a reservation counter configured to be incremented following each implementation of the RESERVE function, and a pop counter configured to be incremented following each implementation of the POP function.

4. The electronic system according to claim 3, wherein said central processor is configured:
to block the RESERVE function based on a value of a difference between a content of said reservation counter and a content of said release counter, and a comparison between this difference value and a capacity of the associated buffer memory; and
to block the POP function based on a value of a difference between a content of said write counter and a content of said pop counter.

5. The electronic system according to claim 1, wherein said plurality of actors comprises a plurality of source actors and a plurality of destination actors; and wherein said plurality of buffer memories comprises:
at least one broadcast buffer memory coupled to a single source actor and to at least two destination actors; and
at least one acquisition buffer memory coupled to at least two source actors and to a single destination actor, said central processor being further configured to manage said plurality of buffer memories based on a token, and for managing the following functions:
a BROADCAST function usable by said at least two destination actors for capturing in parallel the same modified token generated by said single source actor, and available in the said at least one broadcast buffer memory, and for subsequently putting the same modified token back into the FREE state, and
an ACQUISITION function usable by said at least two source actors so that each of these source actors request from said at least one acquisition buffer memory a token in the FREE state, and so that each source actor subsequently returns to said at least one acquisition buffer memory a modified token following a modification of said token in the FREE state.

6. The electronic system according to claim 1, wherein said central processor comprises:
at least one communications interface coupled between said plurality of buffer memories and said at least one hardware accelerator; and
a controller configured to support the communications and synchronization protocol.

7. The electronic system according to claim 6, wherein said controller is configured to provide direct access to said plurality of buffer memories.

8. The electronic system according to claim 6, wherein said plurality of actors comprises a software actor, and wherein said controller is configured to be synchronized via one of said shared synchronization counters and to be programmed by said software actor.

9. The electronic system according to claim 6, wherein each communications interface is configured to receive an operations request stream from said hardware accelerator and to deliver memory operation commands to said plurality of buffer memories, and comprising:
a control block configured to control said plurality of buffer memories and for managing any one of said buffer memories coupled to said hardware accelerator based on tokens;
a synchronization block configured to carry out synchronizations of the tokens; and
a processing block configured to implement the communications and synchronization protocol.

10. The electronic system according to claim 1 wherein the communications and synchronization protocol is adapted to parallel data processing between said plurality of actors and to use of global variables shared by said plurality of actors.

11. An electronic system for implementing a Kahn processing network comprising:
a plurality of actors, with at least one of said actors comprising a processor and at least another one of said actors comprising a hardware accelerator; and
a central processor comprising a plurality of buffer memories coupled between said plurality of actors and configured to enable communications between said plurality of actors according to a protocol, wherein said processor and said hardware accelerator are configured to use different individual protocols, wherein said central processor comprises:
a plurality of shared synchronization counters and a plurality of non-shared synchronization counters associated with said plurality of buffer memories, with the protocol applied between said plurality of actors based on said plurality of shared synchronization counters and said plurality of non-shared synchronization counters, wherein said central processor is configured for managing said plurality of buffer memories based on a token; said plurality of actors comprising a plurality of source actors and a plurality of destination actors, and with each buffer memory comprising at least one token initially in a FREE state and coupled to said at least one source actor and to said at least one destination actor.

12. The electronic system according to claim 11, wherein said central processor is configured for managing a plurality of functions comprising:
a RESERVE function usable by any given source actor for requesting one of said buffer memories coupled to one of said source actors to supply a token in a FREE state;
a PUSH function usable by any given source actor for returning to one of said buffer memories coupled to one of said source actors a modified token following a modification of a token in the FREE state;
a POP function usable by any given destination actor for capturing a modified token of one of said buffer memories coupled to one of said destination actors; and
a RELEASE function usable by any given destination actor for putting a modified token of one of said buffer memories coupled to one of said destination actors back into the FREE state.

13. The electronic system according to claim 12, wherein said plurality of shared synchronization counters comprises a write counter configured to be incremented following each implementation of the PUSH function, and a release counter configured to be incremented following each implementation of the RELEASE function; and wherein said plurality of non-shared synchronization counters comprises a reservation counter configured to be incremented following each implementation of the RESERVE function, and a pop counter configured to be incremented following each implementation of the POP function.

14. The electronic system according to claim 13, wherein said central processor is configured:
to block the RESERVE function based on a value of a difference between a content of said reservation counter and a content of said release counter, and a comparison between this difference value and a capacity of the associated buffer memory; and
to block the POP function based on a value of a difference between a content of said write counter and a content of said pop counter.

15. The electronic system according to claim 11, wherein said plurality of actors comprises a plurality of source actors and a plurality of destination actors; and wherein said plurality of buffer memories comprises:
at least one broadcast buffer memory coupled to a single source actor and to at least two destination actors; and
at least one acquisition buffer memory coupled to at least two source actors and to a single destination actor, said central processor being further configured to manage said plurality of buffer memories based on a token, and for managing the following functions:
a BROADCAST function usable by said at least two destination actors for capturing in parallel the same modified token generated by said single source actor, and available in the said at least one broadcast buffer memory, and for subsequently putting the same modified token back into the FREE state, and
an ACQUISITION function usable by said at least two source actors so that each of these source actors request from said at least one acquisition buffer memory a token in the FREE state, and so that each source actor subsequently returns to said at least one acquisition buffer memory a modified token following a modification of said token in the FREE state.

16. The electronic system according to claim 11, wherein said central processor comprises:
at least one communications interface coupled between said plurality of buffer memories and said at least one hardware accelerator; and
a controller configured to support the protocol.

17. The electronic system according to claim 16, wherein each communications interface is configured to receive an operations request stream from said hardware accelerator and to deliver memory operation commands to said plurality of buffer memories, and comprising:
a control block configured to control said plurality of buffer memories and for managing any one of said buffer memories coupled to said hardware accelerator based on tokens;
a synchronization block configured to carry out synchronizations of the tokens; and
a processing block configured to implement the protocol.

18. A method for implementing a Kahn processing network in an electronic system comprising:
providing a plurality of actors, with at least one of the actors comprising a processor and at least another one of the actors comprising a hardware accelerator; and
providing a central processor comprising a plurality of buffer memories coupled between the plurality of actors and configured to enable communications between the plurality of actors according to a protocol, wherein the processor and the hardware accelerator are configured to use different individual protocols, wherein providing the central processor comprises providing a plurality of shared synchronization counters and a plurality of non-shared synchronization counters associated with the plurality of buffer memories, with the protocol applied between the plurality of actors based on the plurality of shared synchronization counters and the plurality of non-shared synchronization counters, wherein the central processor is configured for managing the plurality of buffer memories based on a token; the plurality of actors comprising a plurality of source actors and a plurality of destination actors, and with each buffer memory comprising at least one token initially in a FREE state and coupled to the at least one source actor and to the at least one destination actor.

19. The method according to claim 18, wherein the central processor is configured for managing a plurality of functions comprising:
a RESERVE function usable by any given source actor for requesting one of the buffer memories coupled to one of the source actors to supply a token in a FREE state;
a PUSH function usable by any given source actor for returning to one of the buffer memories coupled to one of the source actors a modified token following a modification of a token in the FREE state;
a POP function usable by any given destination actor for capturing a modified token of one of the buffer memories coupled to one of the destination actors; and
a RELEASE function usable by any given destination actor for putting a modified token of one of the buffer memories coupled to one of the destination actors back into the FREE state.

20. The method according to claim 19, wherein the plurality of shared synchronization counters comprises a write counter configured to be incremented following each implementation of the PUSH function, and a release counter configured to be incremented following each implementation of the RELEASE function; and wherein the plurality of non-shared synchronization counters comprises a reservation counter configured to be incremented following each implementation of the RESERVE function, and a pop counter configured to be incremented following each implementation of the POP function.

21. The method according to claim 20, wherein the central processor is configured:
to block the RESERVE function based on a value of a difference between a content of the reservation counter and a content of the release counter, and a comparison between this difference value and a capacity of the associated buffer memory; and
to block the POP function based on a value of a difference between a content of the write counter and a content of the pop counter.

22. The method according to claim 18, wherein the plurality of actors comprises a plurality of source actors and a plurality of destination actors; and wherein the plurality of buffer memories comprises:
at least one broadcast buffer memory coupled to a single source actor and to at least two destination actors; and
at least one acquisition buffer memory coupled to at least two source actors and to a single destination actor, the central processor being further configured to manage the plurality of buffer memories based on a token, and for managing the following functions:
a BROADCAST function usable by the at least two destination actors for capturing in parallel the same modified token generated by the single source actor, and available in the at least one broadcast buffer memory, and for subsequently putting the same modified token back into the FREE state, and an ACQUISITION function usable by the at least two source actors so that each of these source actors request from the at least one acquisition buffer memory a token in the FREE state, and so that each source actor subsequently returns to the at least one acquisition buffer memory a modified token following a modification of the token in the FREE state.

* * * * *